Jan. 22, 1963 J. D. CLYMER 3,074,347
ELECTRIC DRIVE UNIT AND MOUNTING
Filed Nov. 21, 1958 3 Sheets-Sheet 1
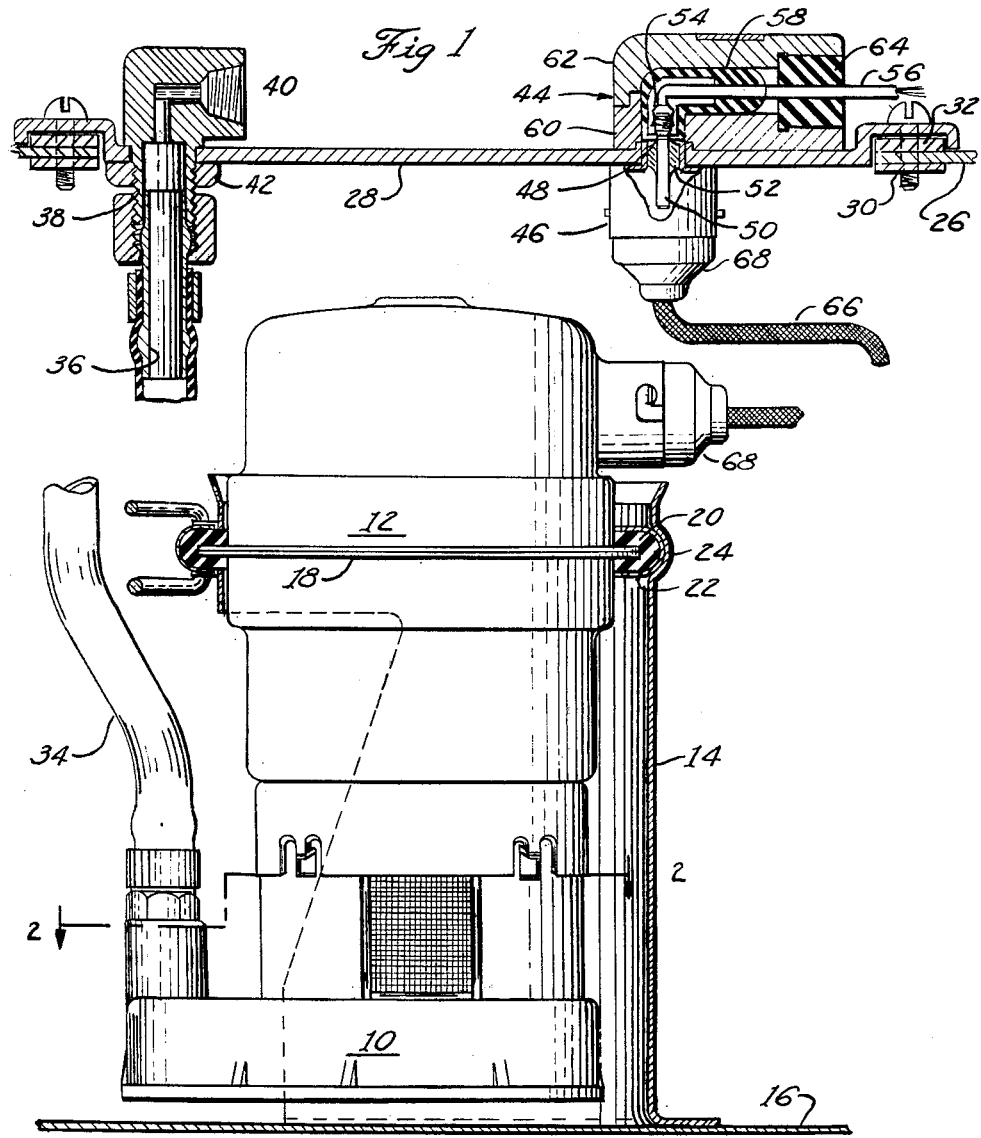
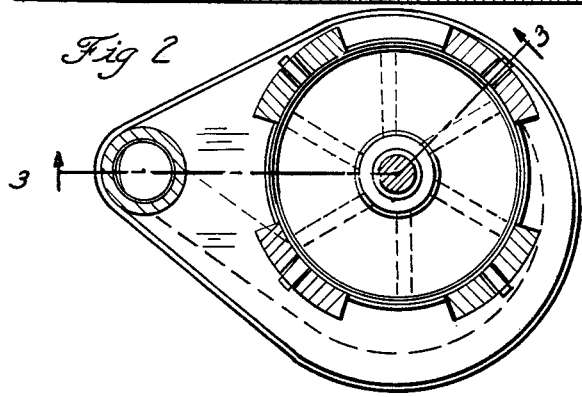
INVENTOR.
JOSEPH D. CLYMER
BY
Schley, Trask & Jenkins
attorneys Jan. 22, 1963  J. D. CLYMER  3,074,347
ELECTRIC DRIVE UNIT AND MOUNTING
Filed Nov. 21, 1958  3 Sheets-Sheet 2
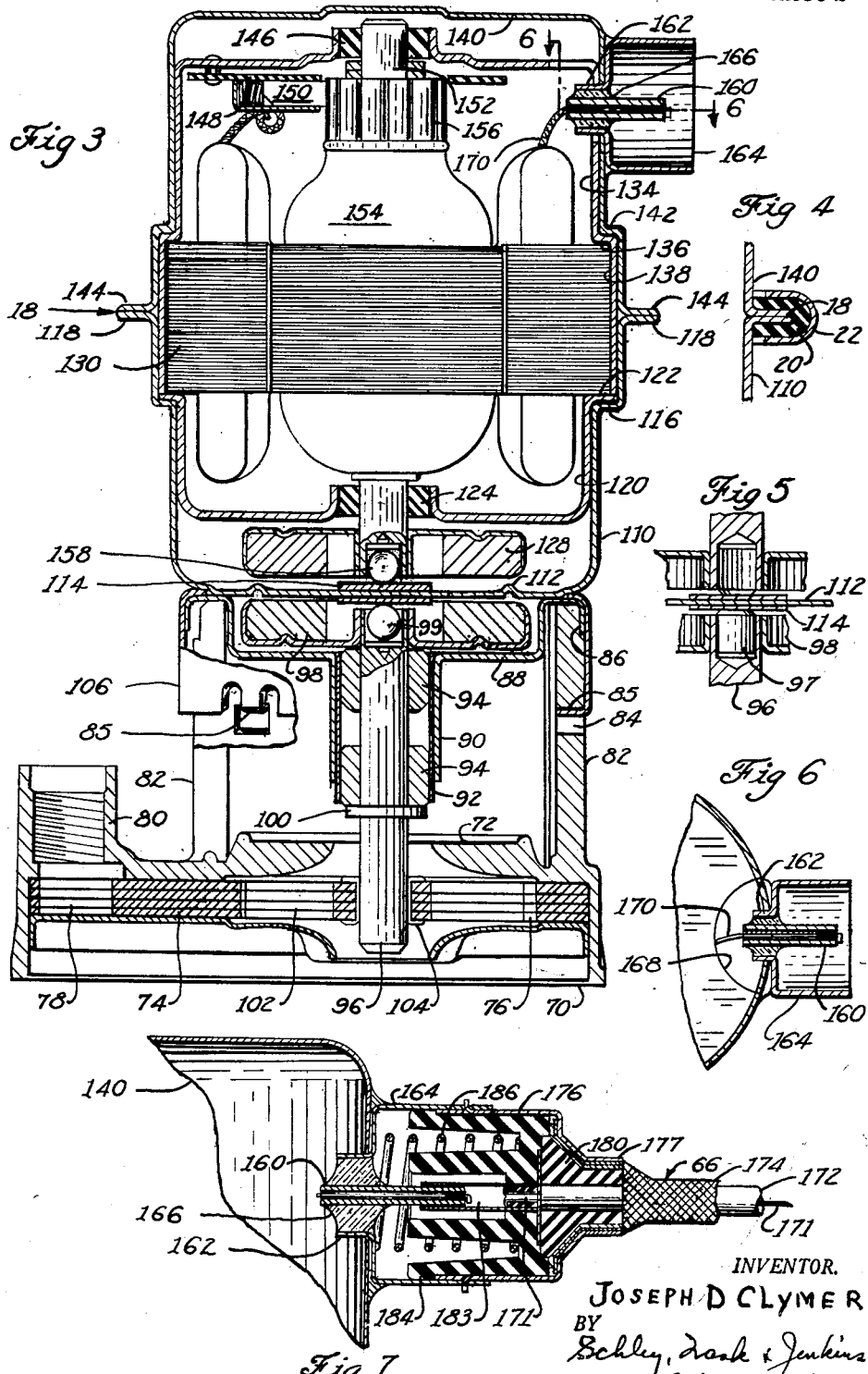
INVENTOR.
JOSEPH D CLYMER
BY
Schley, Nash & Jenkins
Attorneys Jan. 22, 1963   J. D. CLYMER   3,074,347
ELECTRIC DRIVE UNIT AND MOUNTING
Filed Nov. 21, 1958   3 Sheets-Sheet 3
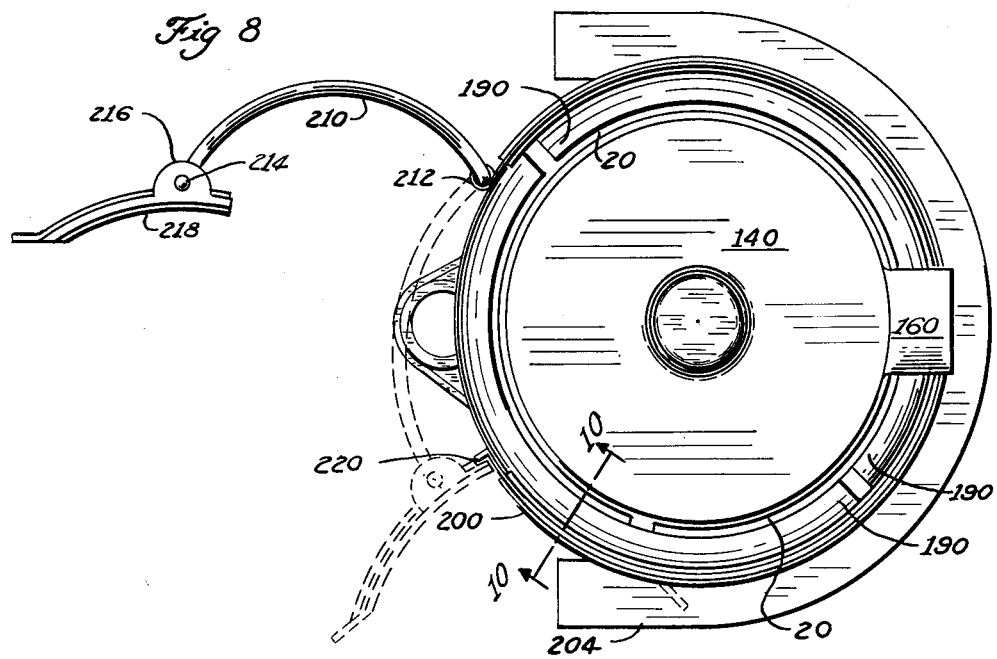
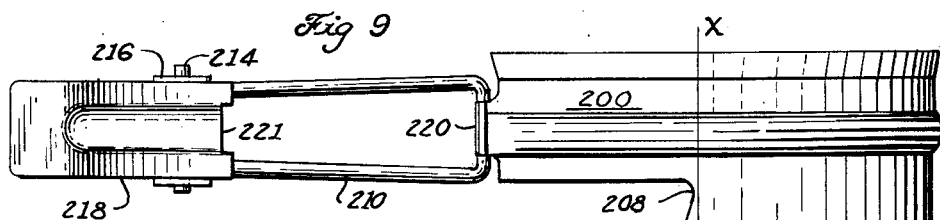
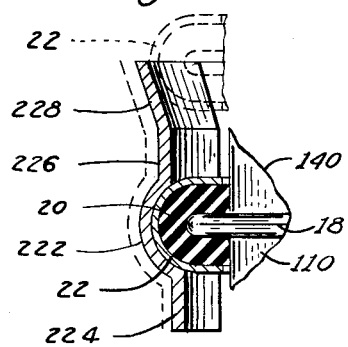
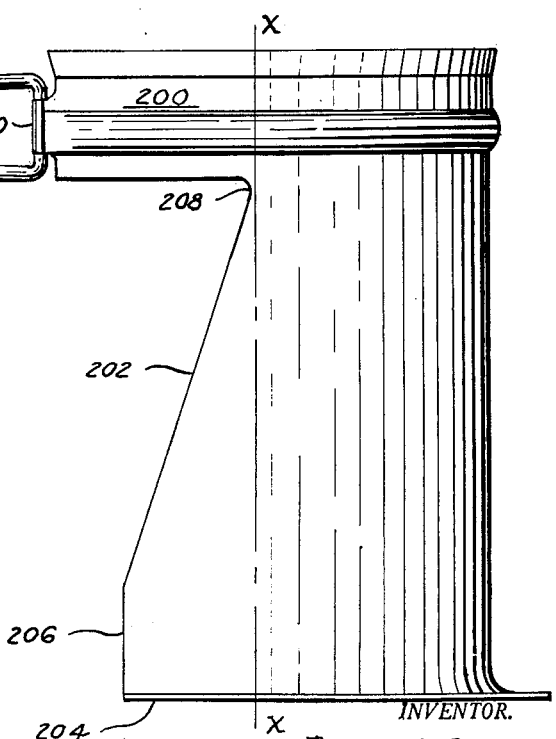
INVENTOR.
JOSEPH D CLYMER
BY
Schley, Lask & Jenkins
Attorneys

United States Patent Office 3,074,347
Patented Jan. 22, 1963

3,074,347
ELECTRIC DRIVE UNIT AND MOUNTING
Joseph D. Clymer, Fort Wayne, Ind., assignor to Tokheim Corporation, Fort Wayne, Ind., a corporation of Indiana
Filed Nov. 21, 1958, Ser. No. 775,446
17 Claims. (Cl. 103—87)

This invention relates to a motor-drive unit and mounting for a magnetically-coupled accessory such as a submerged fuel pump for pumping gasoline or other fuel from the tank of an automotive vehicle; and especially to a hermetically sealed unit and to mounting means cooperating therewith.

The co-pending application of William L. Hudson, Serial No. 538,753, filed October 5, 1955, now Patent No. 2,885,126, discloses a fuel pump having a motor and a magnetic-coupling driving member enclosed in a housing and driving an open submerged pump by means of a magnetic-coupling driven member coupled to the housed driving member through an imperforate wall of the drive assembly housing. This application relates to an improved motor drive unit especially adapted for submerged fuel pumps.

The present invention is especially adapted for use with pump sub-assembly of the type disclosed in application Serial No. 701,047, filed December 6, 1957, now Patent No. 2,947,259, in which the pump and coupling driven member form a sub-assembly separate from a motor driving unit.

It is a principal object of the invention to provide an improved motor drive unit for a magnetically-coupled accessory such as a centrifugal pump, and especially to provide a hermetically sealed drive unit which is adapted for economic commercial production, in which the construction ensures accurate spacing and alinement and concentricity of the motor and coupling parts between themselves and with the driven elements assembled with the unit, which will operate economically and will impose a relatively low power demand on the electrical system of an automotive vehicle; which will withstand the environment in gasoline tanks and the physical abuse encountered in truck and other automotive uses; and which will operate effectively and economically over a long life.

In accordance with the invention, the external housing of the motor drive unit comprises a pair of imperforate shells, preferably deep-drawn sheet-metal shells. These are desirably of stainless steel, both to resist corrosion deterioration and to provide a favorable material through which to magnetically couple the driving and driven coupling elements by which the sealed motor drives the external accessory. The two imperforate shells are joined and hermetically sealed to enclose the motor structure and the magnetic-coupling driving element, with a shell wall in field-transmitting relation with such element. The motor structure interfits with the shell configuration and is thereby held and secured in desired location, alinement, and concentricity when the shells are hermetically joined. The shells are preferably of hat-shaped configuration and are joined by welding or otherwise continuously sealing together two circumferential outward-projecting brims at their edges; which brims in joined state, form a peripheral flange which is used for mounting the motor-pump unit; and the structure is preferably such that the mounting flange encircles the main mass of the motor-pump structure, specifically the stator and rotor cores and windings of the motor. The electrical system of the motor is conveniently of the single-wire type commonly used in automotive practice, with one side of the line grounded; and the live connection to the motor is made by means of a connector pin hermetically sealed through the wall of the motor enclosure by a fused insulating seal. The motor enclosure is provided externally with means for mounting a driven assembly to it, with the driven magnetic-coupling element in field-coupled relation with the element enclosed with the motor. Where the driven element is a pump of the type shown in application Serial No. 701,047, filed December 6, 1957, now Patent No. 2,947,259, the motor drive unit is preferably provided with a depending cylindrical skirt for the reception of the pump assembly. For mounting the drive unit and its driven accessory, the mounting flange is received in a circumferential grooved cushion, retained in a channel-shaped collar; and such collar is seated and clamped in an encircling band clamp on a stand.

Further objects and features of the invention will be evident from the following description and the accompanying drawings of a preferred embodiment.

The accompanying drawings illustrate the invention. In such drawings:

FIG. 1 is a section through an automotive fuel tank showing a motor-pump unit mounted therein which embodies the invention;

FIG. 2 is a horizontal section on the line 2—2 of FIG. 1, indicating the general character of the pump and its mounting to the motor assembly;

FIG. 3 is a vertical section on an enlarged scale of the motor-pump unit of FIG. 1, with the section modified in certain respects for clarity, for example, in that it shows only a single motor brush, and in that the section of the pump is taken substantially on the line 3—3 of FIG. 2 to indicate the method of attachment;

FIG. 4 is a fragmental section showing a mounting cushion and collar associated with the mounting flange;

FIG. 5 is a fragmental section showing a modified thrust bearing;

FIG. 6 is a horizontal section taken on the line 6—6 of FIG. 3 and illustrating the sealed electrical connector pin mounting;

FIG. 7 is a vertical section on an enlarged scale showing an electrical plug connector;

FIG. 8 is a top plan view of the mounted unit shown in FIG. 3;

FIG. 9 is a side elevation of the mounting stand shown in FIG. 8; and

FIG. 10 is a fragmental vertical section of the mounting clamp, taken on the line 10—10 of FIG. 8.

In the installation shown in FIG. 1, the motor-pump unit comprises a pump assembly 10 and a motor drive unit 12 carried by a mounting stand 14 fixed to the bottom wall 16 of the fuel tank. The drive unit has a central mounting flange 18 engaged in an encircling cushion 20 surrounded and embraced by a mounting collar 22; and the collar 22 is releasably clamped in a circumferential seat 24 formed in the mounting stand 14.

The top wall 26 of the tank is provided with an access opening closed by a cover 28. The wall edges surrounding the opening are reinforced by a reinforcing ring 30 and support a gasket 32 on which the cover 28 is seated and sealed. The discharge conduit 34 from the pump 10 is connected by a nipple 36 to the depending shank 38 of a discharge fitting 40 carried by the plate 38 and secured and sealed therein by a nut 42. The cover plate 28 also carries a terminal connector 44. This comprises a receptacle 46 having a reduced neck 48 in which a connector pin 50 is fixed and insulated by fused insulation 52. The upper end of the insulating pin 50 is engaged by a clip 54 carried at the end of a supply wire 56 within a molded boot 58. The connection is housed within a base 60 and a cover 62 and the wire 56 extends outward therefrom through a grommet 64. The electrical connection to the motor is by means of a cable 66 and terminal plugs 68 which will be more fully described below.

The pump shown is substantially as disclosed in application Serial No. 701,047, filed December 6, 1957. It comprises a pump body 70 having a top wall 72 and an outer depending flange forming a downwardly open cavity, in which is inserted a stack of apertured laminations 74 whose apertures define a pump chamber 76 and a discharge passage 78 leading to an outlet fitting 80. The pump body 70 carries four circumferentially spaced posts 82 by which the pump is mounted to the motor-drive unit. The upper ends of the posts 82 fit within an outer downwardly-open channel 86 connected by a depressed radial wall 88 to a depending necked portion forming a bearing support 90. A sleeve 92 pressed in the neck 90 carries a pair of spaced sleeve bearings 94 which support the central pump shaft 96. The upper end of the shaft 96 is fixed within the hub of a carrier for an annular magnet, forming the driven element 98 of a magnetic coupling. The tractive force of the magnetic element 98 acts upward, and the thrust is taken by a ball thrust bearing 99 seated on a hardened disk in a counterbore in the upper end of the shaft 96 and bearing against a thrust plate on the bottom wall of the motor drive assembly. To supplement the thrust bearing support for the shaft 96, as in installations subject to severe jolting, the shaft 96 desirably carries a thrust collar 100 bearing against the lower end of the bottom sleeve bearing 94. The shaft 96 extends downward into the pump chamber 76 within the pump body 70, and carries a stack of bladed laminations forming a pump rotor 102. Desirably, the laminations of the pump rotor are held together by an eyelet 104 and the whole assembly is pressed onto the shaft 96.

The pump is mounted to the bottom of the motor assembly by means of a mounting skirt 106 in which the upper portion of the pump sub-assembly is slidably received against the bottom wall of the motor assembly, and the pump is held in place by inturned fingers 85 engaged in holes 84 in the pump body posts 82.

In certain installations, a modified thrust bearing may be used in place of the thrust ball 99, as shown in FIG. 5. In this instance, the counterbore in the upper end of the shaft 96 receives an anti-friction plug 97 formed of synthetic anti-friction material such as "Teflon" impregnated with graphite. The flat upper end of such plug makes relatively larger surface contact with the thrust plate than the ball 99.

The motor drive assembly or unit shown in FIG. 3 comprises a deep-drawn sheet-metal bottom shell 110, desirably of stainless steel. Such shell has a bottom wall 112 through which the magnetic-coupling operates and which carries hardened thrust plates 114 centrally on its opposite faces to take the tractive thrust between the magnetic elements. At a point intermediate the height of the shell 110, its side wall is offset to form a shoulder 116, and the side wall continues upward a distance beyond such shoulder and then bends outward to form circumferential rim 118 at its upper edge. A motor frame bell 120 nests within the shell 110 and has a top flange 122 which seats against the shoulder 116 of the shell 110. The center of the bottom wall of the shell 110 is upwardly necked to carry a motor shaft bearing 124. Both such bearing and the bell 120 are spaced from the bottom wall 112 of the shell 110 to provide operating room for the driving member 128 of the magnetic-coupling.

A stator assembly 130 including a stack of core laminations is mounted against the upper face of the flange 122 of the bell 120. A top motor frame bell 134 has a flange-like shoulder 136 which engages the top of the stator assembly 130. A cylindrical sleeve wall 138 surrounds the stator assembly and stands as a spacer between the flange 122 and the flange 136, to position the top bell 134 with respect to the bottom bell 120. Desirably, such sleeve wall 138 is integral with the top bell 134. It is slidably received within the upper portion of the side walls of the lower shell 110, which holds it concentric with the lower bell 120. Its abutment with the flange 122 resting on the shell flange 116 accurately locates it with respect to the lower bell 120 and the bottom motor bearing 124.

A top shell 140 encloses the top portion of the motor assembly, and like the bottom shell, this is desirably a deep-drawn stainless steel sheet-metal shell of hat-like configuration. Intermediate the height of its side wall, it is offset to form a shoulder 142, which engages against the shoulder 136 of the top bell. The side wall of the shell 140 extends downward beyond the shoulder 142 in slidable concentric relation with the sleeve wall 138, and has at its lower edge a circumferential rim 144. The shoulder 142 holds the top bell 134 downward; and such shoulder 142 and the companion shoulder 116 of the bottom shell 110 serve to clamp the motor assembly together when the flanges 118 and 144 of such shells are joined.

The top wall of the motor bell 134 is punched upward to form a neck supporting a top bearing 146 for the motor shaft. The lower face of such top wall carries an insulating plate 148 which forms a holder for a pair of motor brushes 150. (For convenience, only a single brush is shown in FIG. 3.)

A motor shaft 152 is mounted in the motor bearings 124 and 146 and carries a motor armature 154 and a commutator 156. The motor shaft 152 extends downward through the bottom bearing 124, and below such bearing has mounted on it a carrier containing an annular magnet and forming the driving element 128 of the magnetic-coupling. Downward thrust of the motor rotor and tractive thrust of the coupling element is taken by a thrust bearing ball 158 seated against a hardened disk in a counterbore in the lower end of a motor shaft 152.

The wiring system of the motor is of the type in which one side of the line is grounded, in accordance with common automotive practice, and one motor lead is grounded to the motor frame, as to the top bell 134. The live wire connection for the motor is made by means of a connector pin 160 hermetically sealed through the wall of the top shell 140. For this purpose, a hollow pin 160 is fixed in the central neck 162 of a receptacle cup 164, by means of a fused insulating mass 166, and this sub-assembly is projection welded to a formed seat on the side wall of the top shell 140, with the neck 162 and hollow pin 160 extending through an aperture in such wall. The top motor bell 134 is provided with a notch 168 (FIG. 6) to pass the inwardly-projecting neck 162 of this connector when the top shell is assembled over the motor. In assembly, the motor lead wire 170 is passed through the hollow pin 160 and is fixed therein by a mass of solder which seals the pin.

The motor parts are conveniently assembled within the two imperforate shells 110 and 140 with the unit in inverted position. The assembly is then clamped together in a suitable fixture which leaves the edges of the shell rims 118 and 144 exposed outward. Such edges are then joined, preferably by welding such edges and fusing the same together. This secures and hermetically seals the motor parts and the driving member of the magnetic-coupling within the enclosure formed by the two shells 110 and 140, with the parts fixed and held in proper alinement as explained above.

The pump to be driven by the motor is assembled therewith by an external mounting element. Preferably, this is the skirt 106, which is secured to the bottom bell 110 by means of an inturned flange at its upper edge seated and welded against the bottom wall 112 of such shell 110 adjacent the periphery of that wall.

As indicated in FIG. 1, the motor is connected to the terminal connector 44 by a cable 66 having connector plugs 68 at its ends. The cable 66 comprises a central wire 171, a surrounding insulating sheet 172, and an enclosing braided wire covering 174, and the cable carries at each end a terminal plug as shown in FIG. 7. The plug comprises a necked sleeve 176 of a size to be received in the receptacle cups 46 and 164 and retained therein by a bayonet joint. The cable cover 174 is engaged against the inner face of the sleeve neck 177 and held therein by a flanged cup surrounding an insulating plug 180 which passes the wire 171 and its sheath 172. A tubular clip is connected to the wire 171 and is held centrally in the sleeve 176 by a filler block 184, in position to engage the projecting end of the connector pin 160 (or 50). The sleeve 176 may be crimped into notches in the plug 184 to hold the assembly together, and a spring 186 is seated in an annular groove of such block 184 to bias the plug outward and thus to releasably lock the bayonet connection.

The sealed-together rims 118 and 144 of the two motor shells form a flange 18 which is desirably used for mounting the motor-pump unit. Such flange 18 is disposed advantageously for use as a mounting, in that it lies at the periphery of the motor mid-way of its height and encircles in direct supporting relation the stator of the motor, so that it lies at or near the level of the center of mass of the motor unit and somewhat above the center of mass of the motor and pump assembly.

For mounting purposes, a channel-shaped cushion strip 20 is wrapped about the motor with the side walls of such strip 20 lying closely against the opposite faces of the mounting flange 18 and extending inward into abutting engagement with the peripheral walls of the motor shells 110 and 140. The strip 20 is made of resilient material such as an elastomer which is stable in the presence of fuels such as gasoline. It is held in place by a pair of half-circle retainers 190 which together form the mounting collar 22. Each is of channel section with a semi-circular outer wall and short inwardly extending flanges, fitting against and embracing the outer and side faces of the cushion strip 20. As is shown in FIG. 8, the cushion strip 20 completely encircles the motor, while the retainers 190 each extend slightly less than 180° about the motor, which permits the retainers to compress the cushion when clamped inward.

The outer convex circumferential surface of the mounting collar 22 formed by the retainers 190 provides a mounting face by which the motor-pump unit may be supported in a suitable mounting seat on a mounting stand.

A preferred stand is shown in FIGS. 8, 9, and 10. This comprises an upper band or clamp portion 200 carried at the top of a supporting wall 202. At its base, the wall 202 is of generally U-shaped configuration, with a substantially semi-circular portion to the right of the center line X—X in FIG. 9 and with forwardly-projecting tangential flat portions 206 to the left of such line. The bottom of the stand is turned outward to form a base flange or foot 204 by which the stand is secured to the bottom wall of a tank. Toward the top, the supporting wall 202 is cut back until its horizontal section is reduced substantially to a semi-circular section, as at the level of the point 208, where the support joins the band clamp 200.

The band clamp 200 is circular in plan but is interrupted at the front to leave a gap of 60 or 70° of arc, and is thus a C-shaped clamp. The free ends of the C-clamp are interconnected by a releasable tension latch, conveniently in the form of a toggle latch. As shown, this is formed by a U-shaped wire spring 210 with its center bight received in a loop 212 at one end of the C-clamp, and a toggle lever 218 pivoted by ears 216 on the out-turned ends 214 of the spring 210. The other free end of the C-clamp carries a projecting hook 220, and the inner end of the latch lever 218 is notched as at 221 for engagement with such hook. The toggle latch 210—218 may be moved to the open position shown in full lines in FIG. 8, to provide convenient clearance to pass through the clamp the projecting nose and discharge conduit 34 of a motor-pump unit, and the tension latch may then be closed.

In vertical section, the C-clamp desirably has the configuration shown in FIG. 10. Such configuration includes a shallow channel portion 222 of circular cross-section whose inner face forms the seat 24 for the outer face of the mounting collar 22 of the motor-pump unit. The channel portion 222 desirably extends inward a greater distance at the bottom than at the top, and is joined at the bottom to a vertical wall portion 224 which at the rear of the stand is a continuation of the supporting wall 202. The channel portion 222 is connected at the top to a vertical section 226 which leads to an outwardly flared throat section 228.

In the operation of inserting a motor-pump unit in the stand shown, the pump and discharge conduit are passed downward through the C-clamp 200 while the latch is in open position as shown in full lines in FIG. 8. The mounting collar 22 of the unit is then rested in the throat section 228, substantially in the position shown in dotted lines in FIG. 10. The pump is then thrust downward to force the collar 22 through the short vertical section 226 of the clamp and into the seat 24 formed by the channel 222. Desirably, the size relationship between the collar 22 and the clamp 200 is such that this movement causes some outward flexing of the clamp, as indicated by the dotted line to the left of FIG. 10, and the fact that the clamp is joined to the supporting wall 202 along a section of reduced length facilitates such flexing while minimizing stress on the supporting structure. The inward extension of the bottom portion of the groove 222 acts as a stop for the collar 22 when it reaches seated position. The toggle latch is then closed, by engaging the notched end of the latch member 218 in the hook 220, and swinging the latch member 218 counterclockwise against the outer side wall of the C-clamp. This draws the clamp 200 tight against the collar 22 which in turn stresses the cushion 20 in compression. Continued movement of the lever carries the toggle past dead-center, and the latch locks itself shut; and the stand is then stiffened by interengagement with the mounting collar 22. The collar 22 is then firmly supported, and the motor-pump mounting flange is resiliently cradled in the cushion held by such collar, to resiliently locate and support the motor-pump unit in the tank.

The invention claimed is:

1. A driving motor unit for a magnetically coupled accessory such as a centrifugal pump, comprising a cupped first shell having an end and side walls, a circumferential shoulder in the side wall, a motor end bell nested in said first shell in positioned engagement with said shoulder and supporting a shaft bearing in spaced relation with said shell end wall, a motor assembly assembled with said end bell and including a rotor having a rotatable shaft extending through said bearing into the space between said bearing and said shell end wall, a magnetic-coupling driving element carried by said shaft in field-transmitting relation with said shell, and a second shell interengaging with said motor assembly to secure the same and said end bell in position, said second shell being sealingly joined to said first shell to form a sealed enclosure about said motor and driving element, and an electrical connection for said motor sealingly fixed through a wall of said enclosure.

2. A driving motor unit as set forth in claim 1 with the addition of a mounting skirt fixed externally to said first shell and in concentric perpendicular relation with said shoulder for mounting an accessory in magnetically coupled alinement with said driving element.

3. A driving motor unit for a magnetically coupled accessory such as a centrifugal pump, comprising a cupped first shell having an end and side walls, a circumferential shoulder in the side wall, a motor end bell nested in said first shell in positioned engagement with said shoulder and supporting a shaft bearing in spaced relation with said shell end wall, a second end bell axially positioned from said first end bell and alined with said first shell, said second bell supporting a shaft bearing, motor stator means fixed between said bells, a motor rotor having a shaft rotatable in said bearings and having an armature carried by said shaft in operative relation with said stator, a magnetic-coupling driving element carried by said shaft between said first bell and said first shell, and a second shell having shoulder means engaging said second bell to secure said motor parts in assembly in said first shell, said two shells being sealingly joined to form a sealed enclosure about said motor and driving element, and an electrical connector for said motor sealingly fixed through a wall of said enclosure.

4. A driving motor unit as set forth in claim 3 in which said shells have outward projecting rims at their edges, said rims being joined to sealingly join the shells, and mounting means engaged with said joined rims for mounting the said unit.

5. A driving motor unit for a magnetically coupled accessory such as a centrifugal pump, comprising a deep-drawn imperforate shell having bottom and side walls, a circumferential shoulder intermediate the height of said side wall, a motor assembly fixed in said shell in positioned engagement with said shoulder and having a rotor shaft rotatably supported in said motor assembly and positioned thereby from said shoulder and extending toward said end wall in concentric perpendicular relation thereto, a magnetic-coupling driving element carried by said shaft for rotation in field-transmitting relation with said shell, a cover joined to said shell to enclose said motor assembly and driving element, and an open projecting cylindrical skirt concentric with said shell and fixed externally to said shell for supporting a driven accessory in magnetically coupled coaxial alinement with said driving element.

6. A driving motor unit as set forth in claim 5 in which said mounting means comprises a cylindrical skirt having a flanged end seated against and joined to the bottom wall of said shell.

7. A driving motor unit for a magnetically-coupled accessory such as a pump, comprising a first drawn shell having side and end walls, a shoulder intermediate the height of the side wall, a motor end bell nested in said shell in positioned engagement with said shoulder and supporting a shaft bearing in spaced relation with said shell end wall, a second motor bell having an outer wall means engaged in concentric relation within said shell and in abutting relation with said first bell whereby the bells and shell are concentrically and axially positioned relative to each other, motor means including a stator and rotor mounted in said bells, said rotor driving a shaft extending through said bearing, a magnetic-coupling driving element mounted on said shaft between said first bell and first shell, and a second shell axially engaging said second bell and sealingly joined to said first shell to secure and enclose said motor assembly and driving element.

8. A driving motor unit for a magnetically-coupled accessory such as a pump, comprising a first drawn shell having bottom and side walls, the side wall having a circumferential shoulder intermediate its height, a motor end bell having a flange seated on said shoulder, a sleeve wall concentrically held within said shell and axially positioned by said bell flange, an opposite end bell wall axially positioned by said sleeve wall and having a flange wall at the end of said sleeve wall, and a second shouldered shell concentrically received over said sleeve wall with its shoulder in securing engagement with said opposite end-bell flange, a motor assembly in said shell structure and having a shaft rotatably supported thereby, said two shells being joined intermediate the length of said sleeve wall to form an enclosure about said motor structure.

9. A driving motor unit for a magnetically-coupled accessory such as a centrifugal pump, comprising a motor assembly including a stator, shaft-bearing means, and a rotor having a shaft carried in said bearing means and having an armature on said shaft in operative relation with said stator, said motor assembly having external outwardly axially disposed circumferential support faces, a magnetic-coupling driving element carried by said motor shaft, and a sealing enclosure for said motor assembly and element and forming a magnetic field-transmitting wall in closely spaced relation with said driving element, said enclosure comprising a pair of drawn shells having rims at their edges and having internal inwardly axially disposed support faces engaging said motor support faces to position said motor assembly within the shells and said driving element in field transmitting relation with said wall, the edge rims of said shells being joined to close said shells about said motor assembly and driving element.

10. A driving motor unit as set forth in claim 9 in which said stator includes a core assembly and said motor support faces lie adjacent the opposite ends of said core assembly, said shell support faces are formed as shoulders in the side walls of the shells, and the joined shell rims encircle the motor intermediate the length of the core assembly and lie substantially in a horizontal plane, with the addition of resilient mounting means encircling said shells and inter-engaged with said joined rims for positioning said unit in vertical position in a mount therefor.

11. A submersible motor-pump unit adapted for mounting in vertical-axis position in the fuel tank of an automotive vehicle, comprising a sealed driving component enclosed by a pair of drawn hat-shaped sheet-metal shells, one of said shells including a thin non-magnetic field-transmitting wall in a plane of generation about an axis, a motor assembly firmly positioned within and by said shells and including a rotor, a magnetic-coupling driving element carried for rotation on said axis by said rotor in field-transmitting relation with said wall, the rims of said hat-shaped shells being hermetically joined to sealingly enclose said motor assembly and element, said unit also comprising a driven pump component mounted from said enclosed driving component exteriorly thereof and depending below said joined rims, said driven component including a pump housing and rotor, and a magnetic-coupling driven member operatively connected to the pump rotor and field-coupled to said driving element through said non-magnetic wall, said joined rims forming a circumferential mounting flange in a plane generally normal to said axis, a resilient mounting cushion encircling said shells and having portions on opposite sides of said flange, and a mounting collar engaging said cushion for resiliently supporting the motor-pump unit as a whole in vertical-axis position with the pump at the bottom of the unit.

12. A submersible motor-pump unit as set forth in claim 11, in which said mounting flange encircles the main mass of the motor assembly.

13. A submersible motor pump unit as set forth in claim 11, in which said mounting flange is above the center of mass of the unit when mounted in said vertical-axis position.

14. A submersible motor-pump unit as set forth in claim 11 in combination with mounting means including a bracket adapted to be rigidly mounted on the wall of a fuel tank, a band clamp fixed to said bracket over a circumferential distance less than 180° to permit the same to expand and contract to receive said mounting collar, said clamp having an inwardly-open encircling seat for said mounting collar and an adjoining flared entrance throat for guiding the collar into the seat, and means to contract the clamp about the seated collar.

15. A submersible motor-pump unit and means for mounting the same in vertical-axis position, as in the fuel tank of an automotive vehicle, comprising a motor-pump unit of generally vertical cylindrical configuration and including a motor assembly in the upper portion thereof and a pump at the lower portion thereof, a generally horizontal circumferential mounting flange standing outward from the side thereof and encircling the main mass of the unit, a resilient mounting cushion encircling the unit and having portions on opposite sides of said flange, a mounting collar surrounding said cushion, a mounting bracket adapted to be fixed to the bottom wall of a fuel tank and supporting a band clamp at an elevated position, said band clamp having an inwardly presented seat for receiving said collar and being contractible about said collar to fixedly support the same and thereby resiliently support the motor-pump unit as a whole in vertical axis position, and means to contract the clamp to said supporting relation.

16. A submersible motor-pump unit and mounting means as set forth in claim 15, with the adidtion of a flared entrance throat formed on said band clamp above said seat to facilitate the entrance of said collar to seated position in said seat.

17. A submersible motor-pump unit and mounting means as set forth in claim 15, in which said bracket comprises an upstanding wall of part-circular configuration joined to said band clamp over a circumferential distance less than 180°.

References Cited in the file of this patent

UNITED STATES PATENTS

| | | |
|---|---|---|
| 1,435,289 | Gilbert | Nov. 14, 1922 |
| 1,586,390 | Steinhart | May 25, 1926 |
| 2,336,716 | Clements | Dec. 14, 1943 |
| 2,350,534 | Rosinger | June 6, 1944 |
| 2,359,215 | Gold | Sept. 26, 1944 |
| 2,463,409 | Moody | Mar. 1, 1949 |
| 2,505,854 | Curzon | May 2, 1950 |
| 2,540,062 | Touborg | Jan. 30, 1951 |
| 2,670,447 | Harmon | Feb. 23, 1954 |
| 2,693,380 | Flanagan | Nov. 2, 1954 |
| 2,707,863 | Rhodes | May 10, 1955 |
| 2,714,674 | Seyfried | Aug. 2, 1955 |
| 2,717,321 | Stearns | Sept. 6, 1955 |

FOREIGN PATENTS

| | | |
|---|---|---|
| 526,946 | Belgium | Mar. 31, 1954 |
| 876,566 | Germany | May 15, 1953 |